United States Patent [19]
Hsieh

[11] Patent Number: 5,811,888
[45] Date of Patent: Sep. 22, 1998

[54] AUTOMATIC VEHICLE POWER AND HEADLIGHT CONTROLLING DEVICE WITH DETECTING FUNCTION OF A GENERATOR AND DELAYED EFFECT

[76] Inventor: Cheng-Tien Hsieh, No. 34 3, Lane 432, Chung-Cheng Road, Chung Ho City, Taipei Hsien, Taiwan

[21] Appl. No.: 747,388

[22] Filed: Nov. 12, 1996

[51] Int. Cl.⁶ .................................................. B60Q 1/14
[52] U.S. Cl. .................... 307/10.8; 315/82; 307/10.8; 361/195
[58] Field of Search .................................... 307/9.1, 10.1, 307/10.6–10.8, 141, 141.4, 141.8, 157; 315/77, 79, 80, 82, 83; 361/173, 177, 195

[56] References Cited

U.S. PATENT DOCUMENTS

| | | | |
|---|---|---|---|
| 3,201,643 | 8/1965 | Hanano | 315/83 |
| 4,236,099 | 11/1980 | Rosenblum | 315/83 |
| 4,862,036 | 8/1989 | Kriss, II | 315/82 |
| 5,483,107 | 1/1996 | Xander | 307/10.8 |

*Primary Examiner*—Richard T. Elms
*Attorney, Agent, or Firm*—Varndell Legal Group

[57] ABSTRACT

An automatic vehicle power and headlight controlling device with delay effect, including a delay circuit, an in-car sensing circuit, an out-car sensing circuit and a power supply circuit. The delay circuit is connected to both the in-car sensing circuit and the power supply circuit, while the out-car sensing circuit is connected to the in-car sensing circuit and powered thereby. After the delay circuit works, the in-car sensing circuit and the power supply circuit are delayedly energized. Only when the in-car sensing circuit works, the out-car sensing circuit is energized. Accordingly, at the stage of initially starting the vehicle, the excessive load on the battery is avoided so that the damage of the battery resulting from the excessive load can be obviated.

9 Claims, 2 Drawing Sheets

AUTOMATIC VEHICLE POWER AND HEADLIGHT CONTROLLING DEVICE WITH DETECTING FUNCTION OF A GENERATOR AND DELAYED EFFECT

BACKGROUND OF THE INVENTION

The present invention relates to an automatic vehicle power and headlight controlling device with a delayed effect, which is applicable to various kinds of vehicles. The automatic controlling device includes a delay circuit which has delay function, whereby at the stage of initially starting the car, an excessive load on the battery is avoided. The automatic controlling device is also able to automatically control the switching between high and low beam modes according to environmental illumination.

When starting a car, if the air-conditioner, stereo or the cigarette lighter of the car is in a powered on state, the current produced by the battery for starting the car is often too low to successfully start the car. Moreover, the instantaneous great load is apt to damage the battery and seriously shorten the useful life of the battery. This is a problem which has existed in power systems of conventional vehicles for a long time.

With respect to headlight and high/low beam automatic control, Taiwanese Publication No. 210597 entitled "an automatic controlling device for high/low beam of vehicle headlight" and No. 210598 entitled "an automatic controlling circuit for vehicle headlight and sidemarker lamp" were published on Aug. 1, 1993. These devices are able to sense the environmental illumination and automatically adjust between the operating modes of the headlight. However, in actual use, much inconvenience still exist in such devices as follows:

1. The mode of switching procedure is too complicated and troublesome to the user.
2. The parts and circuits are quite complicated which increases manufacturing cost.

SUMMARY OF THE INVENTION

It is therefore a primary object of the present invention to provide an automatic vehicle power and headlight controlling device with a delayed effect, which is able to not only effectively improve the problem of power distribution in the instant of starting the vehicle, but also automatically control the switching between high and low beam modes according to environmental illumination. The useful life of the present invention is longer than the conventional similar product and the manufacturing cost of the present invention is reduced. In addition, the power is saved and the volume is minimized. Also, the useful life of the battery is prolonged.

To achieve the above object, the automatic controlling device includes a delay circuit, an in-car sensing circuit, an out-car sensing circuit and an other power supply circuit. The main power is supplied to the positive and negative terminals of the delay circuit by means of switching on the ignition switch ( starting the engine at second stage ) with a key. At the same time, the car is started and the delay circuit is delayedly energized to delay power supply of the power system for the circuits. Such delay circuit employing the screen and transistor only consumes little power so that the car is fully started by the power of the battery. After the engine is started, the generator parallelly generates power for fully supplying power. That is, when the delay time ( generally set to about 10–40 seconds ) ends, the power is distributed to the in-car sensing circuit, out-car sensing circuit and the other power supply circuit for energizing these circuits. Therefore, this measure avoids excessive load and damage of the power supply system resulting therefrom.

After delayedly powered on, the in-car and out-car sensing circuits are able to automatically turn on the headlight and switch high/low beam according to the illumination condition of the road in such a manner that a sensor installed in the vehicle serves to detect the illumination inside the vehicle for determining whether the sidemarker lamp or the headlight should be turned on and a sensor installed outside the vehicle cooperatively serves to determine whether the low beam or the high beam light should be used.

The present invention can be best understood through the following description and accompanying drawing, wherein:

DETAILED DESCRIPTION OF THE PREFERRED EMBODIMENTS

Figure 1:
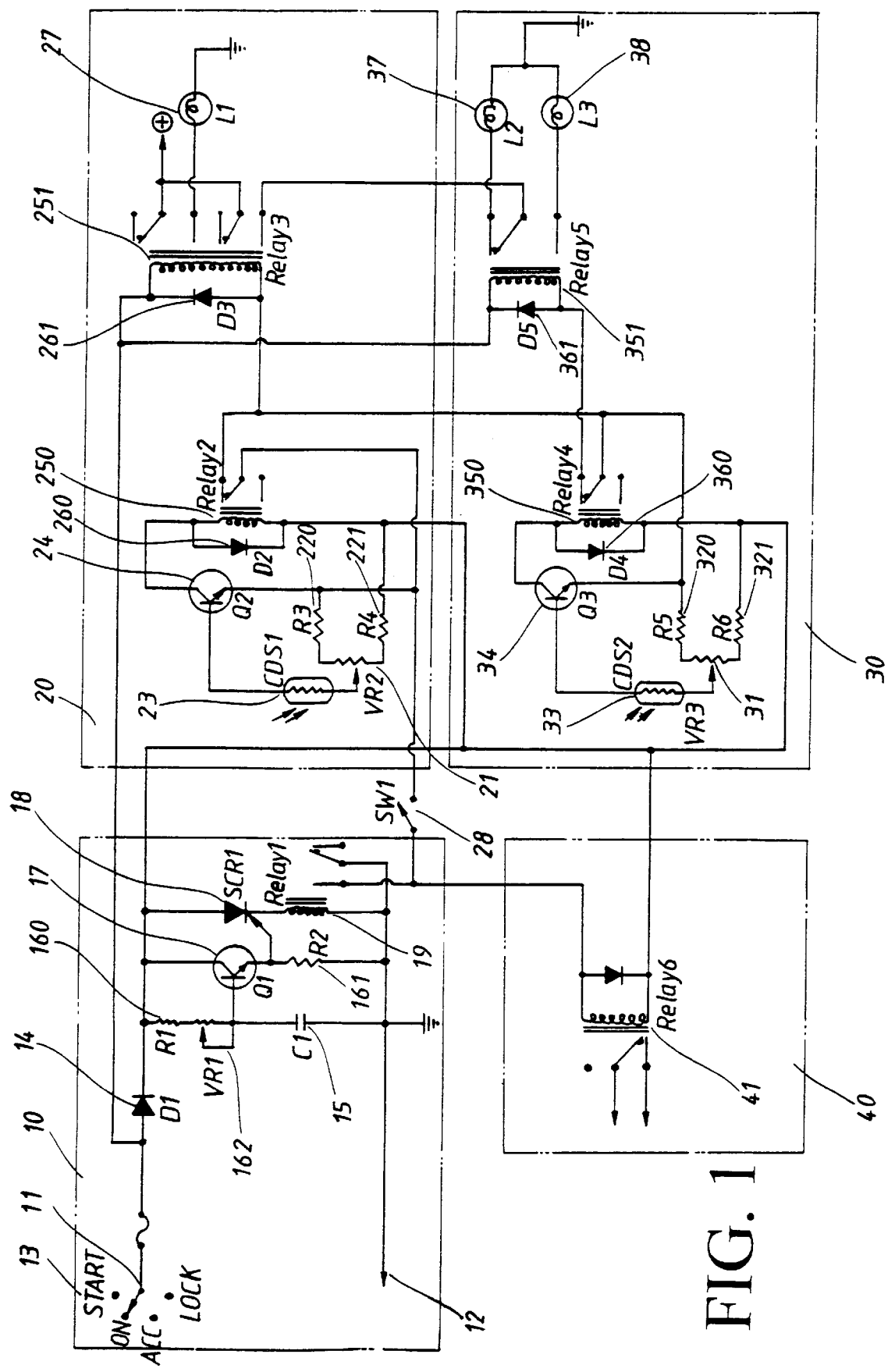
FIG. 1 is a circuit diagram of an embodiment of the present invention.

Please refer to FIG. 1. A preferred embodiment of the present invention includes a delay circuit 10, an in-car sensing circuit 20, an out-car sensing circuit 30 and a power supply circuit 40. The delay circuit 10 is connected to both the in-car sensing circuit 20 and the power supply circuit 40, while the out-car sensing circuit 30 is connected to the in-car sensing circuit 20 and powered thereby. After the delay circuit 10 works, the in-car sensing circuit 20 and the power supply circuit 40 are delayedly energized. Only when the in-car sensing circuit 20 works, the out-car sensing circuit 30 is energized.

The delay circuit 10 is composed of an ignition switch 13, a diode D1 14, a capacitor C1 15, two resistors R1 160, R2 161, a variable resistor VR1 162, a transistor Q1 17, a screen SCR1 18 and a relay RELAY1 19. The in-car sensing circuit 20 is composed of a variable resistor VR2 21, two resistors R3 220, R4 221, a sensor CDS1 23, a transistor Q2 24, two relays RELAY2 250, RELAY3 251, two diodes D2 260, D3 261, a sidemarker lamp L1 27 and a switch SW1 28. The out-car sensing circuit 30 is composed of a variable resistor VR3 31, two resistors R5 320, R6 321, a sensor CDS2 33, a transistor Q3 34, two relays RELAY4 350, RELAY5 351, two diodes D4 360, D5 361, a low beam light L2 37 and a high beam light L3 38. As a whole, the number of the parts of these circuits are greatly reduced relative to the conventional circuit. The power supply circuit 40 is generally controlled by a relay RELAY6 41. The controlled items include the electric appliances except the headlight, such as air-conditioner, stereo, cigarette lighter and electric seat.

The main power is supplied to the positive and negative terminals 11, 12 of the delay circuit 10 by means of switching on the ignition switch 13 ( starting the engine at second stage ) with a key. At the same time, the car is started and the current of the positive terminal 11 is directly supplied to one end of the relays RELAY3 251, RELAY5 351 and through the diode D1 14 to one end of the relays RELAY2 250, RELAY4 350, RELAY6 41. The negative terminal 12 is connected to a common point ( COM point ) of the relay RELAY1 19. The normally open point of the relay RELAY1 19 is connected to the other end of the relay RELAY6 41 and connected to the common point of the relay RELAY2 250 via the switch SW1 28 so as to generally control the switching between the manual operation and automatic operation. At this time, the delay circuit 10 is delayedly energized to delay power supply of the power system for the circuits. When the ignition switch 13 and the switch SW1 28 are switched on, the current passes through the diode D1 14 into the delay circuit composed of the resistors R1 160, R2 161, variable resistor VR1 162, capacitor C1 15, transistor Q1 17, screen SCR1 18 and relay RELAY1 19. By means of the cooperative adjustment of the resistance values of the resistor R1 160 and the variable resistor VR1 162, the delay time can be controlled. Therefore, it can also be a current-limiting resistor with a fixed resistance. Such delay circuit employing the screen and transistor only consumes little power so that the car is fully started by the power of the battery. After the engine is started, the generator parallelly generates power for fully supplying power. That is, when the delay time ( generally set to about 10–40 seconds ) ends, the power is distributed to the in-car sensing circuit 20, out-car sensing circuit 30 and the power supply circuit 40 for energizing these circuits. Therefore, this measure avoids excessive load and damage of the power supply system.

When the delay time ends, the relay RELAY1 19 is energized to make the current of the negative terminal pass into the in-car sensing circuit 20 and the power supply system 40. At this time, the relay RELAY6 41 of the power supply circuit 40 is energized, whereby the air-conditioner, stereo, etc. controlled thereby are operated. On the other hand, the in-car sensing circuit 20 makes the sensor CDS1 23 start to detect the illumination. In the case that the illumination is below a certain value ( which can be adjusted by the variable resistor VR2 21 ), the transistor Q2 24 energizes the relay RELAY2 250 and further energizes the relays RELAY3 251, RELAY4 350 so as to turn on the sidemarker lamp L1 27 and the low beam light L2 37. Simultaneously, the out-car sensing circuit 30 is energized to make the sensor CDS2 33 detect the illumination outside the car. ( Before the relay RELAY2 250 is energized, the out-car sensing circuit 30 consumes no power so that the power is saved. ) In the case that the illumination outside the car is below a certain value ( which can be adjusted by the variable resistor VR3 31 ), the relay RELAY4 350 is energized to make the relay RELAY5 351 turn to energize the high beam light L3 38. Reversely, in the case that the illumination is sufficient, the low beam light L2 37 is restored. Accordingly, the headlight can be automatically turned on and the high/low beam can be automatically exchanged according to the condition of the road.

Figure 2:
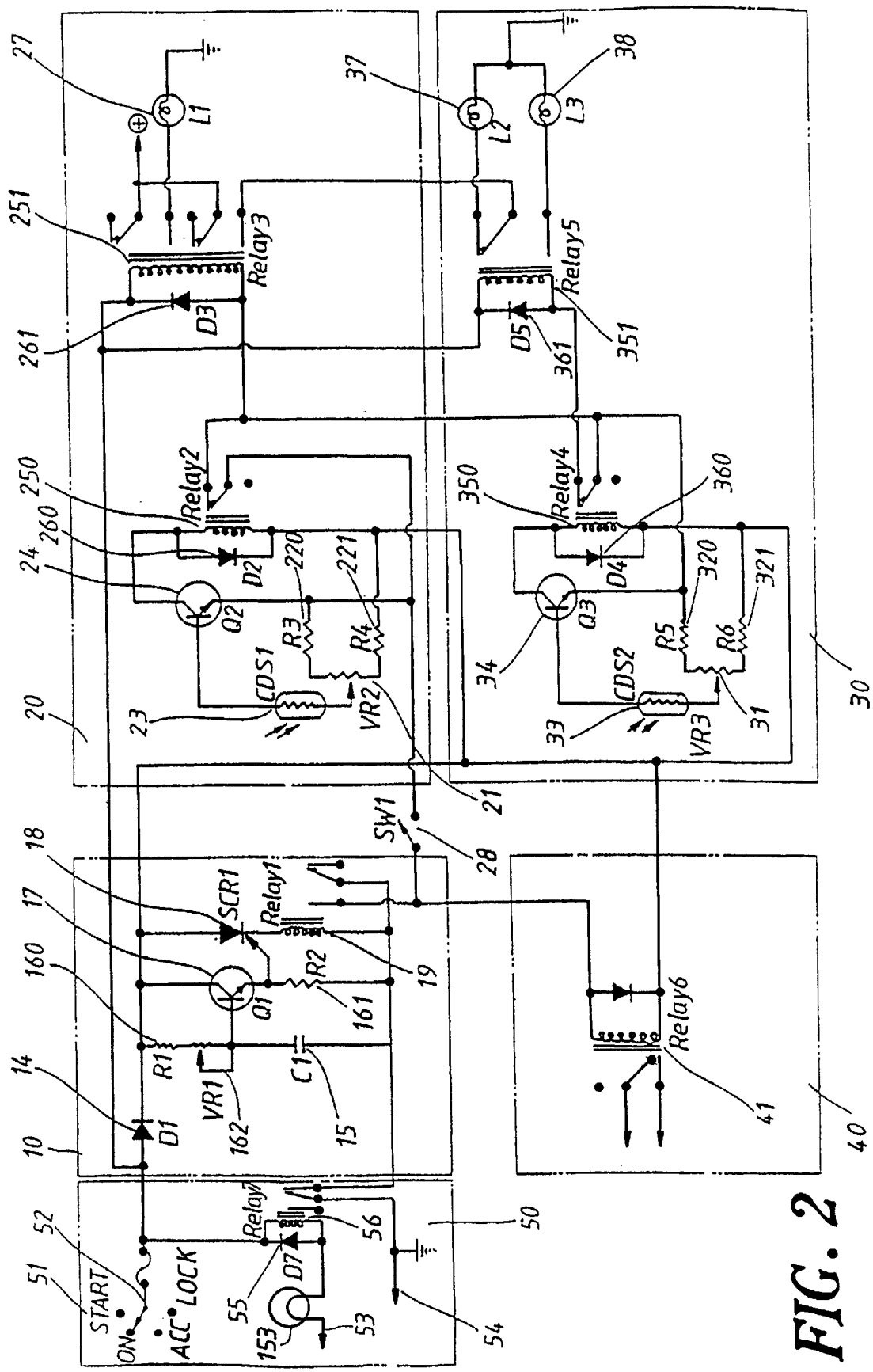
FIG. 2 is a circuit diagram of another embodiment of the present invention.

Referring to FIG. 2, in another preferred embodiment of the present invention, a control circuit 50 is added in front of the delay circuit. The control circuit 50 is connected to the delay circuit 10 and powered thereby. After the control circuit 50 works, the delay circuit 10 is induced to delayedly energize the in-car sensing circuit 20 and the other power supply circuit 40. Only when the in-car sensing circuit 20 works, the out-car sensing circuit 30 is energized.

The control circuit 50 is composed of an ignition switch 51, a diode D7 55, relay RELAY7 56 and a negative power source 53 connected to CHARGE lamp 153. One end of the relay RELAY7 56 is connected to ON of the ignition, while the other end thereof is connected to the negative power source 53. The common point of the relay RELAY7 56 is connected to the negative terminal 54 of the battery, while the normally close point of the relay RELAY7 56 is connected to the common point of the relay RELAY1 19 of the delay circuit 10 and connected to the common point of the relay RELAY7 56 before the key is inserted into the ignition switch. When the key is inserted into the ignition switch 51 to switch on the same, the negative power source 53 makes the common point of the relay RELAY7 56 jumps from the normally close state to the normally open state, whereby the negative terminal 54 cannot energize the delay circuit 10. When the main power is turned on via the ignition switch 51 by the key ( switched to START ), in case the engine is not started initially, the negative power source 53 is not powered off and the CHARGE lamp is still not turned off, so that the control circuit 50 cannot be energized and thus the entire circuit cannot work. The car is continuously started until the engine is started and the key returns to ON position. At this time, normally the CHARGE lamp will be turned off and no negative power passes through the relay RELAY7 56 so that the common point of the relay RELAY7 56 jumps back to the normally close point to connect the power source to the delay circuit 10, making the relay RELAY7 56 energize the negative terminal 54, permitting the current to pass into the delay circuit 10. The succeeding operation is the same as the embodiment shown in FIG. 1 and will not be further described.

According to the above arrangement, the circuit design of the present invention includes less parts and smaller volume than the conventional device and the manufacturing cost of the present invention is lower than the conventional device. Moreover, the parts of the present invention cooperate with each other with higher efficiency so that the power is saved and the using life of the respective parts and battery is prolonged.

Also, according to the present invention, the controlling manner of the car headlight is simplified and only a single switch is used to determine whether a manual operation or an automatic operation mode should be adopted. In actual use, the present invention achieves a better effect and higher competitive ability.

It is to be understood that the above description and drawings are only used for illustrating one embodiment of the present invention, not intended to limit the scope thereof. Any variation and derivation from the above description and drawings should be included in the scope of the present invention.

What is claimed is:

1. An automatic vehicle power and headlight controlling device with delay effect arranged in an automobile having an engine and headlights with high beams and low beams; the automatic vehicle power and headlight controlling device comprising an in-car sensing circuit for sensing illumination inside the automobile, an out-car sensing circuit for sensing illumination outside the automobile, a power supply circuit for powering other electrical devices of the automobile; and a delay circuit for supplying power to the in-car sensing circuit, the out-car sensing circuit, and the power supply circuit after a time delay; wherein:

the delay circuit is connected to both the in-car sensing circuit and the power supply circuit; the delay circuit is adapted for delaying a supply of power to the in-car sensing circuit, the out-car sensing circuit and the power supply circuit when initially starting the engine so that all remaining battery power is used to start the engine, and after the time delay has elapsed and the engine has started, permitting the supply of power to the in-car sensing circuit and the power supply circuit; and the in-car sensing circuit and the out-car sensing circuit are arranged so that the out-car sensing circuit is energized only when the in-car sensing circuit is functioning, the in-car sensing circuit for automatically turning on the headlights based on illumination inside the automobile and the out-car sensing circuit for automatically switching the headlights between high and low beams, when the headlights are on, based on illumination outside the automobile.

2. The automatic controlling device as claimed in claim 1, wherein a normally closed point of a relay of the delay circuit is connected via a switch to a common point of a relay of the in-car sensing circuit, which is connected to a transistor, whereby the switch serves to generally control the switching between a manual operation mode and an automatic operation mode for the delay circuit.

3. The automatic controlling device as claimed in claim 1, wherein a resistor and a variable resistor between a diode and a transistor of the delay circuit can be replaced by a resistor with fixed resistance.

4. The automatic controlling device as claimed in claim 1, wherein the time delay is 10–40 seconds.

5. An automatic vehicle power and headlight controlling device with delay effect arranged in an automobile having an engine and headlights with high and low beams, the automatic vehicle power and headlight controlling device comprising a control circuit, an in-car sensing circuit for sensing illumination inside the automobile, an out-car sensing circuit for sensing illumination outside the automobile and a power supply circuit for powering other electrical devices of the automobile; a delay circuit for supplying power to the in-car sensing circuit, the out-car sensing circuit, and the power supply circuit after a time delay; and a control circuit serving connected to the delay circuit for controlling operation of the delay circuit, the in-car sensing circuit, the out-car sensing circuit, and the power supply circuit; wherein:

the control circuit has an ignition switch for starting the engine of the automobile, and the control circuit is adapted to prevent a supply of power to the delay circuit when the ignition switch is in the start position and to permit the supply of power to the delay circuit when the ignition switch is in the on position;

the delay circuit is connected to both the in-car sensing circuit and the power supply circuit; the delay circuit is adapted for delaying the supply of power to the in-car sensing circuit, the out-car sensing circuit and the power supply circuit when initially starting the engine so that all remaining battery power is used to start the engine, and after the engine has started, permitting the supply power to the in-car sensing circuit and the power supply circuit; and the in-car sensing circuit and the out-car sensing circuit are arranged so that the out-car sensing circuit is energized only when the in-car sensing circuit is functioning, the in-car sensing circuit for automatically turning on the headlights based on illumination inside the automobile and the out-car sensing circuit for automatically switching the headlights between high and low beams, when the headlights are on, based on illumination outside the automobile.

6. The automatic controlling device as claimed in claim 5, wherein one end of a relay of the control circuit is commonly connected to a negative power source connected to a CHARGE lamp so as to serve as a switch for controlling activation of the control circuit.

7. The automatic controlling device as claimed in claim 5, wherein a normally closed point of a relay of the delay circuit is connected via a switch to a common point of a relay of the in-car sensing circuit, which is connected to a transistor, whereby the switch serves to generally control the switching between a manual operation mode and an automatic operation mode for the delay circuit.

8. The automatic controlling device as claimed in claim 5, wherein a resistor and a variable resistor between a diode and a transistor of the delay circuit can be replaced by a resistor with fixed resistance.

9. The automatic controlling device as claimed in claim 5, wherein the time delay is 10–40 seconds.

* * * * *